(12) United States Patent
Wan et al.

(10) Patent No.: US 12,305,035 B2
(45) Date of Patent: May 20, 2025

(54) MODIFIED DEODORANT UREA-FORMALDEHYDE (UF) RESIN AND USE THEREOF, AS WELL AS PARTICLEBOARD AND PREPARATION METHOD THEREOF

(71) Applicants: Southwest Forestry University, Kunming (CN); Kunming Feilin Panel Board Co., Ltd, Kunming (CN); Yunnan Xinzexing Wood Based Panel Co., Ltd., Kunming (CN)

(72) Inventors: Hui Wan, Kunming (CN); Guanben Du, Kunming (CN); Hong Lei, Kunming (CN); Ping Zhao, Kunming (CN); Jianji Chu, Kunming (CN); Tianguo Wen, Kunming (CN); Zhaohui Guo, Kunming (CN); Zhaojin Yang, Kunming (CN); Heming Huang, Kunming (CN); Wenxi Xu, Kunming (CN); Zhenghong Jin, Kunming (CN); Maoli Cui, Kunming (CN); Xuequan Sun, Kunming (CN); Qiumei Li, Kunming (CN)

(73) Assignees: Southwest Forestry University, Kunming (CN); Kunming Feilin Panel Board Co., Ltd., Kunming (CN); Yunnan Xinzexing Wood Based Panel Co., Ltd., Kunming (CN)

( * ) Notice: Subject to any disclaimer, the term of this patent is extended or adjusted under 35 U.S.C. 154(b) by 315 days.

(21) Appl. No.: 17/929,917

(22) Filed: Sep. 6, 2022

(65) Prior Publication Data
US 2023/0312908 A1   Oct. 5, 2023

(30) Foreign Application Priority Data

Mar. 21, 2022   (CN) .......................... 202210280123.X

(51) Int. Cl.
*B27N 3/02*   (2006.01)
*B27N 3/00*   (2006.01)
*C08L 61/30*   (2006.01)
*C08L 97/02*   (2006.01)

(52) U.S. Cl.
CPC .............. *C08L 61/30* (2013.01); *B27N 3/002* (2013.01); *B27N 3/02* (2013.01); *C08L 97/02* (2013.01); *C08L 2205/03* (2013.01); *C08L 2205/16* (2013.01)

(58) Field of Classification Search
CPC . C08L 61/24; C08L 61/28; C08K 2003/3054; C08K 2003/3081; C08G 12/12; B27N 3/02
See application file for complete search history.

(56) References Cited

U.S. PATENT DOCUMENTS 12,221,576 B2 *   2/2025   Rodríguez ............... B27N 9/00

* cited by examiner

*Primary Examiner* — Alison L Hindenlang
*Assistant Examiner* — Debjani Roy
(74) *Attorney, Agent, or Firm* — Stanke Lemon Crouse & Meeks PA

(57) ABSTRACT

The present disclosure provides a modified deodorant urea-formaldehyde (UF) resin and use thereof, as well as a particleboard and a preparation method thereof, and relates to the technical field of wood-based panels. Raw materials for preparing the modified deodorant UF resin provided by the present disclosure include: melamine-modified UF resin (MUF), aluminum ammonium sulfate dodecahydrate, wax, and water. Raw materials for preparing the MUF include: urea, formaldehyde, and melamine. When the modified deodorant UF resin provided by the present disclosure is used to prepare wood-based panels, the aluminum ammonium sulfate dodecahydrate losses 12 crystal water during hot pressing to form a metastable structure $NH_4Al(SO_4)_2$, in which $NH_4^+$ can react with the formaldehyde to reduce formaldehyde emission, and $NH_4^+$ and $Al_3^+$ can absorb hydroxyl groups of organic substances to form hydrogen bonds to reduce odor of the wood-based panels.

11 Claims, No Drawings

MODIFIED DEODORANT UREA-FORMALDEHYDE (UF) RESIN AND USE THEREOF, AS WELL AS PARTICLEBOARD AND PREPARATION METHOD THEREOF

CROSS REFERENCE TO RELATED APPLICATION

This patent application claims the benefit and priority of Chinese Patent Application No. 202210280123.X, filed on Mar. 21, 2022, the disclosure of which is incorporated by reference herein in its entirety as part of the present application.

TECHNICAL FIELD

The present disclosure relates to the technical field of wood-based panels, and in particular, to a modified deodorant urea-formaldehyde (UF) resin and use thereof, as well as a particleboard and a preparation method thereof.

BACKGROUND ART

A particleboard is a wood-based panel that is bonded together under the action of heat and pressure after crushed aggregates made of wood or other lignocellulosic materials are applied with an adhesive or resin. It is mainly used in furniture manufacturing, construction industry, and train and automobile carriage manufacturing. A UF resin is a commonly used particleboard adhesive. However, the particleboard prepared from the UF resin will release certain amount of irritating formaldehyde and odor, which will have certain negative impact on the environment and human body.

SUMMARY

In view of this, the objective of the present disclosure is to provide a modified deodorant UF resin and use thereof, as well as a particleboard and a preparation method thereof. The particleboard prepared from the modified deodorant UF resin provided by the present disclosure has a low formaldehyde emission and little odor or smell.

To achieve the above objective of the present disclosure, the present disclosure provides the following technical solutions:

The present disclosure provides a modified deodorant UF resin. Raw materials for preparing the modified deodorant UF resin include: melamine-modified UF resin (MUF), aluminum ammonium sulfate dodecahydrate, wax, and water.

The MUF includes 45-49% of urea, 48-52% of formaldehyde, and 1-7% of melamine by mass percentage.

The aluminum ammonium sulfate dodecahydrate accounts for 1-7% of the mass of the MUF.

The wax accounts for 0.1-1.5% of the mass of the MUF.

The water accounts for 20-50% of the mass of the MUF.

The present disclosure provides the use of the modified deodorant UF resin according to the above technical solution in wood-based panels.

The present disclosure provides a particleboard, including a first surface layer, a core layer, and a second surface layer which are formed in sequence.

Raw materials for preparing the first surface layer and the second surface layer both include fine particles or shavings and the modified deodorant UF resin according to the above technical solution.

Raw materials for preparing the core layer include coarse particles or shavings and the modified deodorant UF resin according to the above technical solution.

Preferably, the modified deodorant UF resin in the first surface layer and the second surface layer may have a dosage of 20-100 kg/m$^3$ independently.

Preferably, the fine shavings of the first surface layer and the second surface layer may have a length of 0.08-5 mm independently, a width of 0.08-1.5 mm independently, a thickness of 0.08-1.5 mm independently, and a moisture content less than or equal to 14% independently.

Preferably, the modified deodorant UF resin in the core layer may have a dosage of 20-90 kg/m$^3$.

Preferably, the coarse shavings may have a length of 0.08-60 mm, a width of 0.08-3.5 mm, a thickness of 0.08-3.5 mm, and a moisture content less than or equal to 10%.

The present disclosure provides a preparation method of the particleboard according to the above technical solution, including the following steps:

(1) mixing the coarse shavings with the modified deodorant UF resin according to the above technical solution to obtain a coarse material for the core layer;

(2) mixing the fine shavings with the modified deodorant UF resin according to the above technical solution to obtain a fine material for the first and second surface layer; and (3) laying the fine material for the surface layer, the coarse material for the core layer, and the fine material for the surface layer in sequence, and conducting hot pressing to obtain the particleboard, where there is no time sequence between steps (1) and (2).

Preferably, the hot pressing may be conducted at 170-250° C. under 0-5 MPa with a hot pressing factor of 1-5 s/mm.

Preferably, the hot pressing may be a continuous hot pressing, and the continuous hot pressing may include conducting a first zone hot pressing, a second zone hot pressing, a third zone hot pressing, a fourth zone hot pressing, and a fifth zone hot pressing in sequence.

The first zone hot pressing may be conducted at 220-240° C. under 0-5 MPa with a hot pressing factor of 0-0.86 s/mm.

The second zone hot pressing may be conducted at 230-250° C. under 0-4 MPa with a hot pressing factor of 0-0.86 s/mm.

The third zone hot pressing may be conducted at 215-235° C. under 0-3 MPa with a hot pressing factor of 0-0.86 s/mm.

The fourth zone hot pressing may be conducted at 200-220° C. under 0-2 MPa with a hot pressing factor of 0-0.86 s/mm.

The fifth zone hot pressing may be conducted at 170-190° C. under 0-1.5 MPa with a hot pressing factor of 0-0.86 s/mm.

The first zone hot pressing, the second zone hot pressing, the third zone hot pressing, the fourth zone hot pressing, and the fifth zone hot pressing may not be conducted with the hot pressing factor of 0 s/mm at the same time.

The present disclosure provides a modified deodorant UF resin. Raw materials for preparing the modified deodorant UF resin include: MUF, aluminum ammonium sulfate dodecahydrate, wax, and water. The MUF includes 45-49% of urea, 48-52% of formaldehyde, and 1-7% of melamine by mass percentage. The aluminum ammonium sulfate dodecahydrate accounts for 1-7% of a mass of the MUF. The wax accounts for 0.1-1.5% of the mass of the MUF. The water accounts for 20-50% of the mass of the MUF. When the modified deodorant UF resin provided by the present disclosure is used to prepare wood-based panels, the aluminum ammonium sulfate dodecahydrate ($NH_4Al(SO_4)_2 \cdot 12H_2O$) loses 12 crystal water during hot pressing to form a metastable structure $NH_4Al(SO_4)_2$, in which $NH_4^+$ can react with the formaldehyde to reduce formaldehyde emission, and $NH_4^+$ and $Al_3^+$ can absorb hydroxyl groups of organic substances to form hydrogen bonds to reduce the odor of the wood-based panels. The aluminum ammonium sulfate dodecahydratecan can also be used as a curing agent for the UF resin to improve the curing rate of the UF resin and shorten the curing time of the UF resin. Water can reduce the viscosity of the resin, help to distribute the resin evenly on the shavings, and reduce stress built-up in the particleboard during hot pressing. During hot pressing, it will become water vapor, which can help transfer heat and improve the efficiency of hot pressing. The modified deodorant UF resin provided by the present disclosure has a good application prospect in the wood-based panels production.

The present disclosure provides a preparation method of the particleboard, including the following steps: (1) mixing the coarse shavings with the modified deodorant UF resin according to the above technical solution to obtain a resinated material for the core layer; (2) mixing the fine shavings with the modified deodorant UF resin according to the above technical solution to obtain a fine material for the surface layers; and (3) laying the fine material for the surface layer, the coarse material for the core layer, and the fine material for the surface layer in sequence, and conducting hot pressing to obtain the particleboard, where there is no time sequence between steps (1) and (2). According to the present disclosure, the particleboard prepared from the modified deodorant UF resin according to the above technical solution has low formaldehyde emission and little odor. In addition, the modified deodorant UF resin is added to the particleboard, such that the obtained particleboard has high physical and mechanical strength and dimensional stability, and the comprehensive performance of the produced particleboard is ensured. The preparation method provided by the present disclosure requires simple operations and low production cost and is suitable for industrial production.

The present disclosure further provides a particleboard obtained by the preparation method according to the above technical solution. The particleboard provided by the present disclosure has a low formaldehyde emission, little odor, and excellent comprehensive performance. As shown in the test results of the examples, the particleboard provided by the present disclosure has the odor grade of 2.1-2.6, the specific gravity of 0.67-0.69, the static bending strength of 11.9-14 MPa, the modulus of elasticity of 2290-2663 MPa, the internal bonding strength of 0.47-0.72 MPa, the surface bonding strength of 1-1.2 MPa, with the 2-h water absorption thickness swelling of 1.36-1.42%, and the formaldehyde emission of 1.9-2.3 mg/100 g, indicating that the particleboard prepared by the present disclosure has little odor, a low formaldehyde emission, excellent mechanical performance, and low water absorption swelling.

DETAILED DESCRIPTION OF THE EMBODIMENTS

The present disclosure provides a modified deodorant UF resin. Raw materials for preparing the modified deodorant UF resin include: MUF, aluminum ammonium sulfate dodecahydrate, wax, and water.

The MUF includes 45-49% of urea, 48-52% of formaldehyde, and 1-7% of melamine by mass percentage.

The aluminum ammonium sulfate dodecahydrate accounts for 1-7% of the mass of the MUF.

The wax accounts for 0.1-1.5% of the mass of the MUF.

The water accounts for 20-50% of the mass of the MUF.

The raw materials for preparing the modified deodorant UF resin provided by the present disclosure include the MUF. In the present disclosure, the MUF includes 45-49% of the urea by mass percentage, preferably 46-48%, and more preferably 46.5-47.5%. In the present disclosure, the MUF includes 48-52% of the formaldehyde by mass percentage, preferably 49-51%, and more preferably 49.5-50.5%. In the present disclosure, the MUF includes 1-7% of the melamine by mass percentage, preferably 2-5%, and more preferably 2.5-4%.

The raw materials for preparing the modified deodorant UF resin provided by the present disclosure include the aluminum ammonium sulfate dodecahydrate. The aluminum ammonium sulfate dodecahydrate accounts for 1-7% of the mass of the MUF, preferably 2-6.5%, and more preferably 4-6%.

The raw materials for preparing the modified deodorant UF resin provided by the present disclosure include the wax. The wax accounts for 0.1-1.5% of the mass of the MUF, preferably 0.1-1%, and more preferably 0.15-0.45%.

The raw materials for preparing the modified deodorant UF resin provided by the present disclosure include the water. The water accounts for 20-50% of the mass of the MUF, preferably 20-40%, and more preferably 20-30%.

The present disclosure provides a preparation method of the modified deodorant UF resin according to the above technical solution, which preferably includes the following steps:

The melamine, the urea, and the formaldehyde are mixed for a reaction to obtain the MUF.

The MUF, the aluminum ammonium sulfate dodecahydrate, the wax, and the water are mixed and reacted as designed to obtain the modified deodorant UF resin.

In the present disclosure, unless otherwise specified, all raw material components are commercially available, which are well known to those skilled in the art.

In the present disclosure, the melamine, the urea, and the formaldehyde are mixed for a reaction to obtain the MUF. The present disclosure has no special limitation on the mixing method, as long as the raw materials can be uniformly mixed, such as stirring and mixing. In the present disclosure, the reaction is conducted at 50-98° C., and more preferably 80-90° C., for 1-3 h, and more preferably 1.5-2 h.

In the present disclosure, after the MUF is obtained, the MUF, the aluminum ammonium sulfate dodecahydrate, the wax, and the water are mixed to obtain the modified deodorant UF resin. The present disclosure has no special limitation on the mixing method, as long as the raw materials can be uniformly mixed, such as stirring and mixing. In a specific example of the present disclosure, the mixing sequence is preferably as follows: dissolving aluminum ammonium sulfate dodecahydrate in water to obtain an aqueous solution of aluminum ammonium sulfate; and mixing the MUF, the wax, and the aqueous solution of aluminum ammonium sulfate to obtain the modified deodorant UF resin. In the present disclosure, the aluminum ammonium sulfate dodecahydrate in the aqueous solution of aluminum ammonium sulfate has a concentration of preferably 10-40 wt. %, more preferably 18-35 wt. %, further preferably 20-30 wt. %, and most preferably 23 wt. %. In the present disclosure, the water has a temperature of preferably 20-90° C., more preferably 30-70° C., and further preferably 40-50° C.

The preparation method of the modified deodorant UF resin provided by the present disclosure requires simple operations, cost-effective raw materials with wide sources, and low production cost, and is suitable for industrial production.

The present disclosure provides the use of the modified deodorant UF resin according to the above technical solution in wood-based panels. In the present disclosure, the wood-based panel is preferably an indoor wood-based panel, and more preferably a particleboard.

The present disclosure provides a particleboard, including a first surface layer, a core layer, and a second surface layer which are formed in sequence.

In the present disclosure, raw materials for preparing the first surface layer and the second surface layer both include fine shavings and the modified deodorant UF resin according to the above technical solution. In the present disclosure, the modified deodorant UF resin in the first surface layer and the second surface layer have a dosage of 20-100 kg/m$^3$ independently, more preferably 40-100 kg/m$^3$, and further preferably 75-85 kg/m$^3$. In the present disclosure, the fine shavings have a length of preferably 0.08-5 mm, and more preferably 0.1-2 mm. The fine shavings have a width of preferably 0.08-1.5 mm, and more preferably 0.1-2 mm. The fine shavings have a thickness of preferably 0.08-1.5 mm, and more preferably 0.1-2 mm. The fine shavings have a moisture content preferably less than or equal to 14%, and more preferably 11-12%.

In the present disclosure, raw materials for preparing the core layer include coarse shavings and the modified deodorant UF resin according to the above technical solution. In the present disclosure, the modified deodorant UF resin in the core layer has a dosage of 20-90 kg/m$^3$, and further preferably 45-55 kg/m$^3$. In the present disclosure, the coarse shavings have a length of preferably 0.08-60 mm, more preferably 10-50 mm, and further preferably 20-30 mm. The coarse shavings have a width of preferably 0.08-3.5 mm, and more preferably 0.1-2 mm. The coarse shavings have a thickness of preferably 0.08-3.51 mm, and more preferably 0.1-2 mm. The coarse shavings have a moisture content preferably less than or equal to 10%, and more preferably 6-7%.

In the present disclosure, a method for preparing the fine shavings and coarse shavings includes the following steps:

Tree branches are chipped to obtain wood chips.

The wood chips are flaked and then dried to obtain particles or shavings.

The shavings are sieved to obtain the coarse shavings and the fine shavings.

In the present disclosure, the branches are chipped to obtain the wood chips. In the present disclosure, the branches have a diameter of preferably less than or equal to 25 cm, and more preferably 10-20 cm. In the present disclosure, the chipping is preferably conducted using a chipper. In the present disclosure, the wood chips have a length of preferably 25-40 mm, and more preferably 30-35 mm. The wood chips have a width of preferably 10-20 mm, and more preferably 15-18 mm. The wood chips have a thickness of preferably 5-10 mm, and more preferably 6-8 mm.

After the wood chips are obtained, in the present disclosure, the wood chips are flaked and then dried to obtain the shavings. In the present disclosure, the flaking is preferably conducted using a flaker. In the present disclosure, the drying is conducted at preferably 200-450° C., and more preferably 300-350° C. The present disclosure has no special limitation on the drying time, as long as the drying is conducted until the moisture content of the obtained shavings is less than or equal to 2%. The drying is preferably conducted in a dryer.

After the shavings are obtained, in the present disclosure, the shavings are sieved to obtain the coarse shavings and the fine shavings. In the present disclosure, the sieving is preferably conducted using a single-layer sieve in sequence to obtain the particles passed through the sieve. Then the passed through particles are sieved using a double-layer sieve to obtain the coarse shavings and the fine shavings. In the present disclosure, a screen of the single-layer sieve has a size of preferably 3.5 mm×60 mm, the shavings on the single-layer sieve is preferably further ground by a grinding machine, and fine materials obtained from grinding directly enter a fine material scraper as the fine shavings. The passed through particles are then sieved by the double-layer sieve. In the present disclosure, the double-layer sieve includes a coarse sieve and a fine sieve. The screen of the coarse sieve has a size of preferably 1.5 mm×5 mm. the screen of the fine sieve has a size of preferably 150-180 meshes. The shavings on the coarse sieve are the coarse shavings. The shavings on the fine sieve are the fine shavings. The particles passed through the fine sieve are powder shavings, which will be used as fuel.

The present disclosure provides the preparation method of the particleboard according to the above technical solution, including the following steps:

(1) The coarse shavings are mixed with the modified deodorant UF resin according to the above technical solution to obtain a coarse material for the core layer.

(2) The fine shavings are mixed with the modified deodorant UF resin according to the above technical solution to obtain a fine material for the surface layers.

(3) The fine material for the surface layer, the coarse material for the core layer, and the fine material for the surface layer are laid in sequence, and hot pressing is conducted to obtain the particleboard.

There is no time sequence difference between steps (1) and (2).

In the present disclosure, the coarse shavings are mixed with the modified deodorant UF resin according to the above technical solution to obtain the coarse material for the core layer. The present disclosure has no special limitation on the mixing method, as long as the raw materials can be uniformly mixed using the mixing method well known to those skilled in the art, mixing is conducted with a resin blender.

In the present disclosure, first fine shavings are mixed with the modified deodorant UF resin according to the above technical solution to obtain a fine material for the first surface layer. The present disclosure has no special limitation on the mixing method, as long as the raw materials can be uniformly mixed using the mixing method well known to those skilled in the art, mixing is conducted with a resin blender.

In the present disclosure, second fine shavings are mixed with the modified deodorant UF resin according to the above technical solution to obtain a fine material for the second surface layer. The present disclosure has no special limitation on the mixing method, as long as the raw materials can be uniformly mixed using the mixing method well known to those skilled in the art, mixing is conducted with a resin blender.

After the fine material for the surface layers and the coarse material for the core layer are obtained, in the present disclosure, the fine material for the surface layer (the fine material for the second surface layer), the coarse material for the core layer, and the fine material for the surface layer (the fine material for the first surface layer) are laid in sequence, and hot pressing is conducted to obtain the particleboard. The present disclosure has no special limitation on the laying, and a laying method well known to those skilled in the art may be adopted. In the present disclosure, the fine material for the first surface layer, the coarse material for the core layer, and the fine material for the second surface layer have a mass ratio of preferably (15-25):(50-70):(15-25), and more preferably 20:60:20.

In the present disclosure, the hot pressing is conducted at preferably 170-250° C. under preferably 0-5 MPa with a hot pressing factor of preferably 1-5 s/mm. In the present disclosure, the hot pressing is preferably continuous hot pressing, and the continuous hot pressing preferably includes conducting the first zone hot pressing, the second zone hot pressing, the third zone hot pressing, the fourth zone hot pressing, and the fifth zone hot pressing in sequence. In the present disclosure, the first zone hot pressing is conducted at preferably 220-240° C., more preferably 225-230° C., and further preferably 230° C. The first zone hot pressing is conducted under preferably 0-5 MPa, more preferably 1-4 MPa, and further preferably 3.5-4.5 MPa. The first zone hot pressing is conducted with a hot pressing factor of preferably 0-0.86 s/mm, and further preferably 0.86 s/mm. In the present disclosure, the second zone hot pressing is conducted at preferably 230-250° C., more preferably 235-245° C., and further preferably 240° C. The second zone hot pressing is conducted under preferably 0-4 MPa, more preferably 1-3.5 MPa, and further preferably 2.5-3.5 MPa. The second zone hot pressing is conducted with a hot pressing factor of preferably 0-0.86 s/mm, more preferably 0.2-0.7 s/mm, and further preferably 0.3-0.5 s/mm. In the present disclosure, the third zone hot pressing is conducted at preferably 215-235° C., more preferably 220-230° C., and further preferably 225° C. The third zone hot pressing is conducted under preferably 0-3 MPa, more preferably 1-2.5 MPa, and further preferably 1.5-2.5 MPa. The third zone hot pressing is conducted with a hot pressing factor of preferably 0-0.86 s/mm, more preferably 0.2-0.7 s/mm, and further preferably 0.3-0.5 s/mm. In the present disclosure, the fourth zone hot pressing is conducted at preferably 200-220° C., more preferably 205-215° C., and further preferably 210° C. The fourth zone hot pressing is conducted under preferably 0-2 MPa, more preferably 0.5-1.5 MPa, and further preferably 0.8-1.2 MPa. The fourth zone hot pressing is conducted with a hot pressing factor of preferably 0-0.86 s/mm, more preferably 0.2-0.7 s/mm, and further preferably 0.3-0.5 s/mm. In the present disclosure, the fifth zone hot pressing is conducted at preferably 170-190° C., more preferably 175-185° C., and further preferably 180° C. The fifth zone hot pressing is conducted under preferably 0-1.5 MPa, more preferably 0.5-1 MPa, and further preferably 0.6-0.8 MPa. The fifth zone hot pressing is conducted with a hot pressing factor of preferably 0-0.86 s/mm, more preferably 0.2-0.7 s/mm, and further preferably 0.3-0.5 s/mm. In the present disclosure, the continuous hot pressing is preferably conducted in a continuous hot pressing machine, and the continuous hot pressing machine is preferably provided with five heating zones, which are denoted as the first to fifth zones according to the material passing order.

After the hot pressing, the present disclosure preferably further includes cooling and stacking the hot pressed panel for stabilizing the panel dimension to obtain the desired particleboard. In the present disclosure, cooling the panel is to preferably place the hot pressed panel on a panel cooling rack to 25-45° C. Overheating the UF resin in the particle will cause a thermal degradation of it, and the present disclosure can reduce the harm of thermal degradation of the UF resin through cooling the panel. In the present disclosure, the stacking for stabilizing the panel dimension is conducted at preferably 5-30° C., and more preferably 10-20° C. The stacking for stabilizing the panel dimension is conducted for preferably 1-96 h, and more preferably 48 h. The stacking for stabilizing the panel dimension is conducted under the environment with relative humidity of preferably 40-70%, and more preferably 50-60%. In the present disclosure, the particleboard has a moisture content of preferably 4-10%, and more preferably 6-8%. By stacking for stabilizing the panel dimension, the temperature and moisture content of the particleboard will be balanced with the surrounding environment, thereby improving its dimensional stability.

The technical solutions in the present disclosure are clearly and completely described below in conjunction with examples of the present disclosure. It is clear that the described examples are merely a part, rather than all of the examples of the present disclosure. All other examples obtained by those of ordinary skilled in the art based on the examples of the present disclosure without creative efforts shall fall within the protection scope of the present disclosure.

Example 1

Urea, formaldehyde, and melamine were mixed at the mass ratio of 47:50:3 for a reaction at 90° C. for 1.5 h to obtain MUF. Aluminum ammonium sulfate dodecahydrate was dissolved in water at 40° C. to obtain an aluminum ammonium sulfate solution. The MUF, the aluminum ammonium sulfate solution, and wax were mixed to obtain modified deodorant UF resin. The aluminum ammonium sulfate dodecahydrate in the aluminum ammonium sulfate solution had a concentration of 18 wt. %, and the aluminum ammonium sulfate dodecahydrate, the wax, and the water accounted for 4.68%, 0.8%, and 21.32% of a mass of the MUF respectively.

Wood branches with a diameter less than or equal to 25 cm were chipped to obtain wood chips with a length less than or equal to 35 mm, a width less than or equal to 18 mm, and a thickness less than or equal to 8 mm. The wood chips were flaked and then dried until a moisture content was less than or equal to 2% to obtain shavings with a length less than or equal to 15 mm, a width less than or equal to 3 mm, and a thickness less than or equal to 1 mm with the qualified rate of the size of the shavings being greater than or equal to 88%. The shavings were sieved by a single-layer sieve (having a screen with a size of 3.5 mm×60 mm) to obtain two parts of wood materials. The part on the sieve was ground by a grinding machine, and fine materials obtained from grinding were directly entered a fine material scraper as the fine shavings. The part passed the sieve was then sieved by a double-layer sieve composed of a coarse sieve (having a screen with a size of 1.5 mm×5 mm) and a fine sieve (having a screen with a size of 150-180 meshes). The part on the coarse sieve was the coarse shavings. The part on the fine sieve was the fine shavings. The fine shavings were blended with the modified deodorant UF resin in a surface resin blender to obtain a fine material or shaving for the surface layer. The coarse shavings were blended with the modified deodorant UF resin to obtain a coarse material or shaving for the core layer. The fine material for the surface layer, the coarse material for the core layer, and the fine material for the surface layer were laid in sequence, formed the first surface layer, the core layer, and the second surface layer, placed in a continuous hot pressing machine for continuous hot pressing (the first zone hot pressing was conducted at 230° C. under 5 MPa with a hot pressing factor of 0.86 s/mm; the second zone hot pressing was conducted at 240° C. under 4 MPa with a hot pressing factor of 0.86 s/mm; the third zone hot pressing was conducted at 225° C. under 3 MPa with a hot pressing factor of 0.86 s/mm; the fourth zone hot pressing was conducted at 210° C. under 2 MPa with a hot pressing factor of 0.86 s/mm; and the fifth zone hot pressing was conducted at 180° C. under 1.5 MPa with a hot pressing factor of 0.86 s/mm). The hot pressed panels were placed on the panel cooling rack to cool to 35° C., and stacked at 25° C. under relative humidity of 50% for stabilizing panel dimension for 48 h, to obtain the particleboards. Here, the modified deodorant UF resin in the first surface layer and the second surface layer had a dosage of 55 kg/m$^3$, and the modified deodorant UF resin in the core layer had a dosage of 45 kg/m$^3$. The fine material for the first surface layer, the coarse material for the core layer, and the fine material for the second surface layer had the mass ratio of 1:3:1.

Example 2

The modified deodorant UF resin and the particleboard were prepared according to the method of Example 1. The difference from Example 1 was that in raw materials for preparing the modified deodorant UF resin, the concentration of the prepared aluminum ammonium sulfate solution was adjusted to 18.7 wt. %, and the masses of the aluminum ammonium sulfate dodecahydrate and the water at 40° C. were 4.86% and 21.13% of the mass of the MUF respectively.

Example 3

The modified deodorant UF resin and the particleboard were prepared according to the method of Example 1. The difference from Example 1 was that in raw materials for preparing the modified deodorant UF resin, the concentration of the prepared aluminum ammonium sulfate solution was adjusted to 19.4 wt. %, and the masses of the aluminum ammonium sulfate dodecahydrate and the water at 40° C. were 5.04% and 20.96% of the mass of the MUF respectively.

Example 4

The modified deodorant UF resin and the particleboard were prepared according to the method of Example 1. The difference from Example 1 was that in raw materials preparing the modified deodorant UF resin the concentration of the prepared aluminum ammonium sulfate solution was adjusted to 20 wt. %, and the masses of the aluminum ammonium sulfate dodecahydrate and the water at 40° C. were 5.2% and 20.8% of the mass of the MUF respectively.

Example 5

The modified deodorant UF resin and the particleboard were prepared according to the method of Example 1. The difference from Example 1 was that in raw materials preparing the modified deodorant UF resin, the concentration of the prepared aluminum ammonium sulfate solution was adjusted to 20.6 wt. %, and the masses of the aluminum ammonium sulfate dodecahydrate and the water at 40° C. were 5.36% and 20.64% of the mass of the MUF respectively.

Example 6

The modified deodorant UF resin and the particleboard were prepared according to the method of Example 1. The difference from Example 1 was that in raw materials preparing the modified deodorant UF resin, the concentration of the prepared aluminum ammonium sulfate solution was adjusted to 21.3 wt. %, and the masses of the aluminum ammonium sulfate dodecahydrate and the water at 40° C. were 5.54% and 20.46% of the mass of the MUF respectively.

Example 7

The modified deodorant UF resin and the particleboard were prepared according to the method of Example 1. The difference from Example 1 was that in raw materials preparing the modified deodorant UF resin, the concentration of the prepared aluminum ammonium sulfate solution was adjusted to 21.9 wt. %, and the masses of the aluminum ammonium sulfate dodecahydrate and the water at 40° C. were 5.69% and 20.31% of the mass of the MUF respectively.

Example 8

The modified deodorant UF resin and the particleboard were prepared according to the method of Example 1. The difference from Example 1 was that in raw materials preparing the modified deodorant UF resin, the concentration of the prepared aluminum ammonium sulfate solution was adjusted to 22.5 wt. %, and the masses of the aluminum ammonium sulfate dodecahydrate and the water at 40° C. were 5.85% and 20.15% of the mass of the MUF respectively.

Comparative Example 1

The modified deodorant UF resin and the particleboard were prepared according to the method of Example 1. The difference from Example 1 was that the modified deodorant UF resin did not contain the aluminum ammonium sulfate dodecahydrate.

Comparative Example 2

The modified deodorant UF resin and the particleboard were prepared according to the method of Example 2. The difference from Example 2 was that the modified deodorant UF resin did not contain the aluminum ammonium sulfate dodecahydrate.

Comparative Example 3

The modified deodorant UF resin and the particleboard were prepared according to the method of Example 3. The difference from Example 3 was that the modified deodorant UF resin did not contain the aluminum ammonium sulfate dodecahydrate.

Comparative Example 4

The modified deodorant UF resin and the particleboard were prepared according to the method of Example 4. The difference from Example 4 was that the modified deodorant UF resin did not contain the aluminum ammonium sulfate dodecahydrate.

Comparative Example 5

The modified deodorant UF resin and the particleboard were prepared according to the method of Example 5. The difference from Example 5 was that the modified deodorant UF resin did not contain the aluminum ammonium sulfate dodecahydrate.

Comparative Example 6

The modified deodorant UF resin and the particleboard were prepared according to the method of Example 6. The difference from Example 6 was that the modified deodorant UF resin did not contain the aluminum ammonium sulfate dodecahydrate.

Comparative Example 7

The modified deodorant UF resin and the particleboard were prepared according to the method of Example 7. The difference from Example 7 was that the modified deodorant UF resin did not contain the aluminum ammonium sulfate dodecahydrate.

Comparative Example 8

The modified deodorant UF resin and the particleboard were prepared according to the method of Example 8. The difference from Example 8 was that the modified deodorant UF resin did not contain the aluminum ammonium sulfate dodecahydrate.

Test Example 1

The odor, specific gravity, static bending strength, modulus of elasticity, internal bonding strength, surface bonding strength, thickness, 2-h water absorption thickness swelling, and formaldehyde emission of the particleboards prepared by Examples 1 to 8 and Comparative Examples 1 to 8 were tested. The method for testing the odor was LYT 3236-2020 "Grading and evaluation methods for odor of wood-based panels and its products". The method for testing the formaldehyde emission was GB/T 39600 2021 "Formaldehyde emission grading for wood-based panel and finishing products". The method for testing the static bending strength, modulus of elasticity, the internal bonding strength, and the surface bonding strength was GB/T 4897-2015 "Particleboard". The test results are shown in Table 2:

Table 2 Test results of particleboards prepared in Examples 1 to 8 and Comparative Examples 1 to 8

TABLE 2

| Performance | Odor | Specific gravity | Static bending strength (MPa) | Elastic modulus (MPa) | Internal bonding strength (MPa) | Surface bonding strength (MPa) | Thickness (mm) | 2-h water absorption thickness expansion rate (%) | Formaldehyde Emission (mg/100 g) |
|---|---|---|---|---|---|---|---|---|---|
| Example 1 | 2.5 | 0.68 | 14 | 2507 | 0.53 | 1.2 | 18 | 1.41 | |
| Example 2 | 2.1 | 0.69 | 13.0 | 2216 | 0.72 | 1.0 | 18 | 1.42 | |
| Example 3 | 2.4 | 0.67 | 11.9 | 2661 | 0.47 | 1.0 | 18 | 1.42 | |
| Example 4 | 2.4 | 0.68 | 12.5 | 2663 | 0.56 | 1.1 | 18 | 1.38 | |
| Example 5 | 2.3 | 0.68 | 13.6 | 2290 | 0.49 | 1.1 | 18 | 1.36 | |
| Example 6 | 2.6 | 0.68 | 13.6 | 2290 | 0.49 | 1.1 | 16 | 1.36 | |
| Example 7 | 2.4 | 0.67 | 12.5 | 2553 | 0.48 | 1.0 | 18 | 1.40 | 1.9 |
| Example 8 | 2.3 | 0.68 | 13.2 | 2627 | 0.52 | 1.1 | 18 | 1.38 | 2.3 |
| Comparative Example 1 | 2.8 | 0.68 | 13.5 | 2521 | 0.55 | 1.18 | 18 | 1.38 | |
| Comparative Example 2 | 2.9 | 0.69 | 14.4 | 2622 | 0.55 | 1.2 | 18 | 1.38 | |
| Comparative Example 3 | 2.7 | 0.68 | 12.7 | 2495 | 0.54 | 1.1 | 18 | 1.39 | |
| Comparative Example 4 | 2.9 | 0.68 | 13.2 | 2601 | 0.57 | 1.1 | 18 | 1.38 | |
| Comparative Example 5 | 2.8 | 0.68 | 13.4 | 2440 | 0.53 | 1.1 | 18 | 1.38 | |
| Comparative Example 6 | 2.9 | 0.68 | 13.48 | 2521 | 0.55 | 1.18 | 16 | 1.38 | |
| Comparative Example 7 | 2.6 | 0.68 | 13.2 | 2592 | 0.52 | 1.1 | 18 | 1.40 | 2 |
| Comparative Example 8 | 2.8 | 0.69 | 13.5 | 2608 | 0.58 | 1.2 | 18 | 1.36 | 2.8 |

As can be seen from Table 2, the particleboard provided by the present disclosure has the odor grade of 2.1-2.6, the specific gravity of 0.67-0.69, the static bending strength of 11.9-14 MPa, the modulus of elasticity of 2290-2663 MPa, the internal bonding strength of 0.47-0.72 MPa, the surface bonding strength of 1-1.2 MPa, the 2-h water absorption thickness swelling of 1.36-1.42%, and the formaldehyde emission of 1.9-2.3 mg/100 g. Statistical analysis shows that when the confidence level was 95%, aluminum ammonium sulfate added replaced a common curing agent and significantly reduced the odor and the formaldehyde emission of the *Eucalyptus* particleboard made without affecting the performance of the particleboard. It shows that the modified deodorant UF resin prepared by the present disclosure resulted in the particleboard had little odor, low formaldehyde emission, excellent mechanical performance, and comparable low water absorption thickness swelling. Its performance met the requirement of relevant standards (LYT 3236-2020 and GB/T 39600 2021).

The above descriptions are merely preferred implementations of the present disclosure. It should be noted that those of ordinary skilled in the art may further make several improvements and modifications without departing from the principle of the present disclosure, but such improvements and modifications should be deemed as falling within the protection scope of the present disclosure.

What is claimed is:

1. A preparation method of a particleboard, the particleboard comprising a first surface layer, a core layer, and a second surface layer which are formed in sequence, wherein raw materials for preparing the first surface layer and the second surface layer both comprise fine shavings or particles and a modified deodorant urea-formaldehyde (UF) resin; and raw materials for preparing the core layer comprise coarse shavings or particles and the modified deodorant UF resin, and the preparation method comprising the following steps:
(1) mixing the coarse shavings with the modified deodorant UF resin to obtain a coarse material for the core layer;
(2) mixing the fine shavings with the modified deodorant UF resin to obtain a fine material for the two surface layers; and
(3) laying the fine material for the first surface layer, the coarse material for the core layer, and the fine material for the second surface layer in sequence, and conducting hot pressing to obtain the particleboard,
wherein there is no time sequence between steps (1) and (2), and
wherein the modified deodorant UF resin is prepared from the following raw materials: melamine-modified UF resin (MUF), aluminum ammonium sulfate dodecahydrate, wax, and water, wherein the MUF comprises 45-49% of urea, 48-52% of formaldehyde, and 1-7% of melamine by mass percentage; the aluminum ammonium sulfate dodecahydrate accounts for 1-7% of a mass of the MUF; the wax accounts for 0.1-1.5% of the mass of the MUF; and the water accounts for 20-50% of the mass of the MUF.

2. The preparation method according to claim 1, wherein the modified deodorant UF resin in the first surface layer and the second surface layer has a dosage of 20-100 kg/m$^3$ independently.

3. The preparation method according to claim 1, wherein the fine shavings of the first surface layer and the second surface layer have a length of 0.08-5 mm independently, a width of 0.08-1.5 mm independently, a thickness of 0.08-1.5 mm independently, and a moisture content less than or equal to 14% independently.

4. The preparation method according to claim 1, wherein the modified deodorant UF resin in the core layer has a dosage of 20-90 kg/m$^3$.

5. The preparation method according to claim 1, wherein the coarse shavings have a length of 0.08-60 mm, a width of 0.08-3.5 mm, a thickness of 0.08-3.5 mm, and a moisture content less than or equal to 10%.

6. The preparation method according to claim 1, wherein the hot pressing is conducted at 170-250° C. under 0-5 MPa with a hot pressing factor of 1-5 s/mm.

7. The preparation method according to claim 1, wherein the hot pressing is continuous hot pressing, and the continuous hot pressing comprises conducting a first zone hot pressing, a second zone hot pressing, a third zone hot pressing, a fourth zone hot pressing, and a fifth zone hot pressing in sequence;
the first zone hot pressing is conducted at 220-240° C. under 0-5 MPa with a hot pressing factor of 0-0.86 s/mm;
the second zone hot pressing is conducted at 230-250° C. under 0-4 MPa with a hot pressing factor of 0-0.86 s/mm;
the third zone hot pressing is conducted at 215-235° C. under 0-3 MPa with a hot pressing factor of 0-0.86 s/mm;
the fourth zone hot pressing is conducted at 200-220° C. under 0-2 MPa with a hot pressing factor of 0-0.86 s/mm;
the fifth zone hot pressing is conducted at 170-190° C. under 0-1.5 MPa with a hot pressing factor of 0-0.86 s/mm; and
the first zone hot pressing, the second zone hot pressing, the third zone hot pressing, the fourth zone hot pressing, and the fifth zone hot pressing are not conducted with a hot pressing factor of 0 s/mm at the same time.

8. The preparation method according to claim 2, wherein the fine shavings of the first surface layer and the second surface layer have a length of 0.08-5 mm independently, a width of 0.08-1.5 mm independently, a thickness of 0.08-1.5 mm independently, and a moisture content less than or equal to 14% independently.

9. The preparation method according to claim 2, wherein the hot pressing is conducted at 170-250° C. under 0-5 MPa with a hot pressing factor of 1-5 s/mm.

10. The preparation method according to claim 4, wherein the coarse shavings have a length of 0.08-60 mm, a width of 0.08-3.5 mm, a thickness of 0.08-3.5 mm, and a moisture content less than or equal to 10%.

11. The preparation method according to claim 6, wherein the hot pressing is continuous hot pressing, and the continuous hot pressing comprises conducting a first zone hot pressing, a second zone hot pressing, a third zone hot pressing, a fourth zone hot pressing, and a fifth zone hot pressing in sequence;
the first zone hot pressing is conducted at 220-240° C. under 0-5 MPa with a hot pressing factor of 0-0.86 s/mm;
the second zone hot pressing is conducted at 230-250° C. under 0-4 MPa with a hot pressing factor of 0-0.86 s/mm;
the third zone hot pressing is conducted at 215-235° C. under 0-3 MPa with a hot pressing factor of 0-0.86 s/mm;

the fourth zone hot pressing is conducted at 200-220° C. under 0-2 MPa with a hot pressing factor of 0-0.86 s/mm;

the fifth zone hot pressing is conducted at 170-190° C. under 0-1.5 MPa with a hot pressing factor of 0-0.86 s/mm; and the first zone hot pressing, the second zone hot pressing, the third zone hot pressing, the fourth zone hot pressing, and the fifth zone hot pressing are not conducted with a hot pressing factor of 0 s/mm at the same time.

* * * * *